No. 846,692. PATENTED MAR. 12, 1907.
C. A. PARSONS & J. TURNBULL.
CONTROLLING MEANS FOR VALVES.
APPLICATION FILED JUNE 9, 1905.
2 SHEETS—SHEET 1.
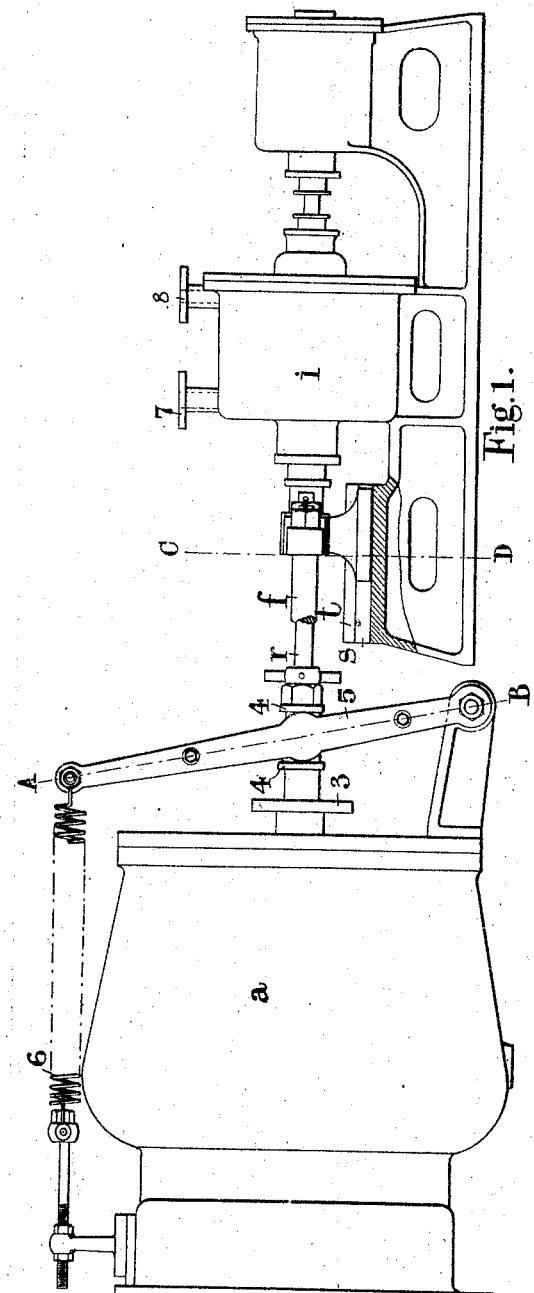
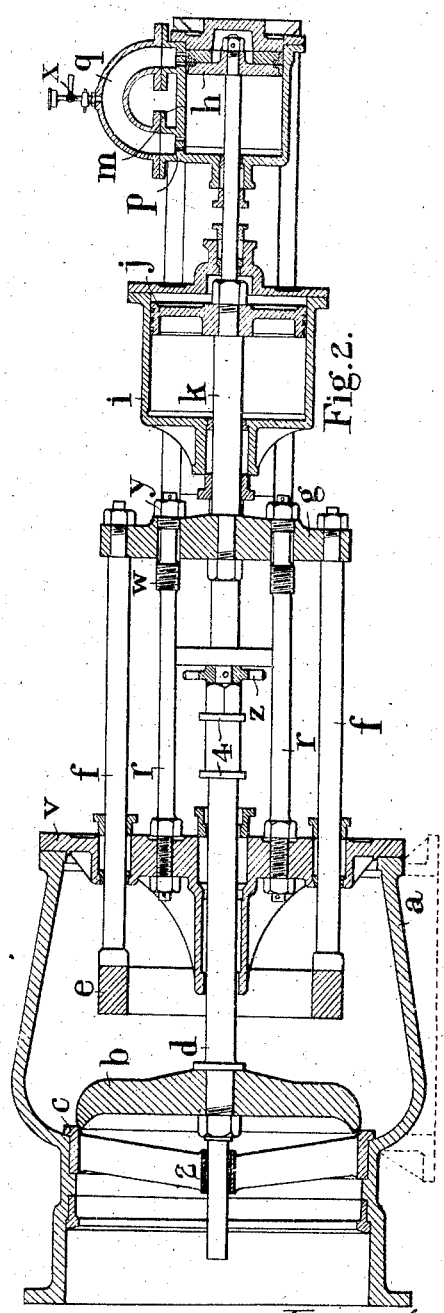

No. 846,692. PATENTED MAR. 12, 1907.
C. A. PARSONS & J. TURNBULL.
CONTROLLING MEANS FOR VALVES.
APPLICATION FILED JUNE 9, 1905.

2 SHEETS—SHEET 2

Attest
Edward N. Sarton
Beatrice Phillips

Inventor
Charles A. Parsons
John Turnbull
by Spear, Middleton, Donaldson & Spear
Attys.

UNITED STATES PATENT OFFICE.

CHARLES ALGERNON PARSONS, OF NEWCASTLE-UPON-TYNE, AND JOHN TURNBULL, OF WALLSEND, ENGLAND; SAID TURNBULL ASSIGNOR TO SAID PARSONS.

CONTROLLING MEANS FOR VALVES.

No. 846,692. Specification of Letters Patent. Patented March 12, 1907.

Application filed June 9, 1905. Serial No. 264,481.

*To all whom it may concern:*

Be it known that we, CHARLES ALGERNON PARSONS and JOHN TURNBULL, subjects of the King of Great Britain and Ireland, residing at Heaton Works, Newcastle-upon-Tyne, England, and Turbinia Works, Wallsend-upon-Tyne, England, respectively, have invented new and useful Improvements in and Relating to Controlling Means for Valves, of which the following is a specification.

The invention relates to improvements in controlling means for large lift-valves, and is specially applicable to marine steam-turbine installations in which non-return valves are disposed in the piping which connects the exhaust end of one turbine with the inlet end of another. The invention may also be applied in other cases where it is desirable that a non-return-valve connection should sometimes act as a stop-valve and close against pressure.

The object of the invention is to close such valves quickly and readily against pressure.

The invention consists in a non-return valve having a controlling-motor adapted to close the valve against pressure readily and quickly when required.

The invention further consists in providing a valve of this type with clamping means, whereby the valve may be held shut against the steam-pressure tending to open it, and various other details, as hereinafter described.

Such motor-controlled valves may with advantage be used in any case where a combination of non-return and stop valves are employed—as, for instance, in any fluid-distribution system, especially where two or more pressures of fluid are used, or in the case where the steam-pipe from two batteries of boilers unite. In this latter case this form of valve would be especially useful when anything occurred to stop the whole of one battery. The invention is also useful in marine or other steam-turbine plants having a turbine on one shaft connected by piping with turbines on other shafts in order that the connection or connections between certain of the turbines may be closed against pressure when required—as, for instance, when one of the shafts is reversed or stopped or driven at a different speed.

Figure 3:
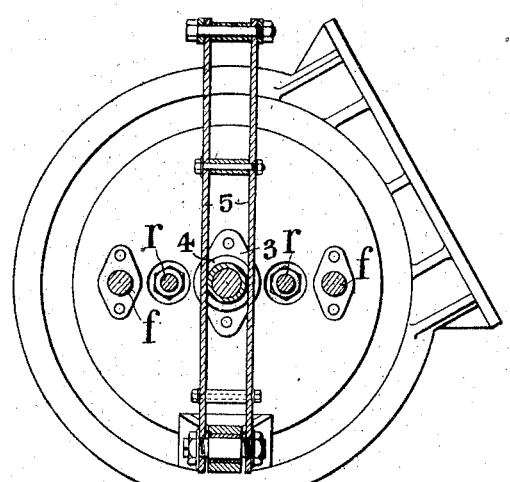
Figure 4:
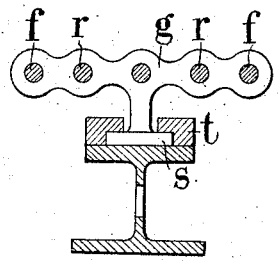

Referring now to the accompanying drawings, which form part of our specification, Figure 1 is a side elevation showing the improved valve in one form. Fig. 2 is a sectional elevation of the valve shown in Fig. 1. Fig. 3 is a section on the line A B of Fig. 1, and Fig. 4 is a section on the line C D of Fig. 1.

In carrying the invention into effect according to one form as illustrated in the accompanying drawings a non-return valve $b$ is disposed within a casing $a$ and adapted when in the closed position to make a fluid-tight joint with a seating $c$. Passing through the center of the valve there is a guide-spindle $d$, which is a working fit in the guide 2 and stuffing-gland 3 and is provided with two collars 4 4, between which there works the pivoted lever 5. A spring 6, adapted to hold the valve $b$ resiliently to its seat, is provided at the extremity of the pivoted lever. Concentrically with the guide-spindle $d$ there is a ring $e$, carried by two rods $f$, which pass out through glands in the cover $v$ and are connected by a cross-head $g$ at their outer extremities. This cross-head $g$ (see Fig. 4) is provided with a slipper $s$, adapted to slide in a guide $t$, and at its center is connected, by means of a rod $k$, to a piston $j$, arranged to work in a cylinder $i$. Steam or other motive fluid may be supplied to the cylinder through the pipes 7 and 8. With this apparatus if steam be supplied through the pipe 8 the piston $j$ will be moved forward, so as to bring the ring $e$ to bear against the valve $b$ and hold it against its seating $c$. The area of the piston $j$ is such that with the available pressure of operating fluid it shall be able to close the non-return valve and hold it shut against the steam-pressure tending to open it.

If it is desired to hold the valve shut—as, for instance, when a turbine is to be shut down for some time—nuts $y$, gearing with screws $w$ on long studs $r$, are tightened up, so as to rigidly hold the ring $e$ in its lowest position.

In order to prevent the motor $i$ from moving the valve too quickly against its face, and thereby causing damage, we provide a dash-pot cylinder $m$, arranged coaxially with the motor-cylinder $i$. In this cylinder there works a piston $h$, connected by an extension of the rod $k$ to the motor-piston $j$, while oil or other fluid is provided to assist the cushioning effect. Thus when the piston $j$ moves forward the piston $h$ is also drawn forward, thus forcing the oil or other fluid contained in the front of the cylinder $m$ through suitably-proportioned openings $p$ and o and a passage q to the back end of the cylinder m. It will be seen that as the piston h approaches the end of its stroke it covers the holes o, thus reducing the area of oil-passage from the front to the rear end of the cylinder m, and thereby increasing the resistance offered by the oil to the movement of the motor.

The sizes of the holes o and p should be such as to provide the necessary cushioning for the motor h.

A suitable cock x is provided on the pipe q, connecting the two ends of the cylinder m, for the purpose of filling the cylinder with oil or allowing entrapped air to escape. A handle z may also be provided on the valve-spindle d for the purpose of turning the valve b round, so as to prevent uneven wear of the seating, as will be readily understood.

This form of valve may be used in turbine installations having three shafts with a high-pressure turbine on the center one and a low-pressure turbine on each side shaft, the steam from the high-pressure turbine being divided between the two low-pressure turbines. Our non-return valves are placed in the connections between the high and two low pressure turbines. In cases of emergency we are thereby enabled to forcibly close quickly either of the valves, so as to close the connection between the high-pressure and one of the low-pressure turbines to enable the high-pressure and the other low-pressure turbine to be worked ahead, while the disconnected low-pressure turbine is being worked astern by means of the usual maneuvering-valves, which independently admit steam to the reversing-turbine or to the inlet of the low-pressure turbine. Our invention may be applied to other arrangements of turbines where non-return valves are used, such as between the exhausts of cruising turbines and the main turbines or between the exhausts of one cruising turbine (or high-pressure turbine) and steam-passage of another cruising turbine, (or intermediate-pressure cruising turbine,) into which the first cruising turbine (or high-pressure cruising turbine) exhausts, and then between the second cruising-turbine (or intermediate-pressure cruising-turbine) exhaust and main turbines. It will be readily seen, however, that this form of valve is not only applicable to turbine installations, but may be used in a great variety of ways.

What we claim as our invention, and desire to secure by Letters Patent, is—

1. In combination, a non-return valve, a controlling-motor arranged coaxially with and adapted to close said non-return valve against pressure, said valve and motor being both capable of independent motion, a dash-pot arranged to retard the action of the controlling-motor, substantially as described.

2. In combination, a non-return valve, a fluid-pressure motor, a cross-head adapted to be reciprocated by said motor, rods attached to said cross-head, and passing fluid tightly through the non-return-valve casing, a ring supported on the ends of the rods and arranged to bear against the valve so as to close it against pressure when required, substantially as described.

3. In combination, a non-return valve, a controlling-motor adapted to close said valve against pressure, means for holding the valve shut independently of the controlling-motor comprising studs r, a coöperating cross-head g and nut y, substantially as described.

4. In combination, a non-return valve, a fluid-pressure motor adapted to close said valve against pressure, said valve and motor being both capable of independent motion and mounted coaxially, a dash-pot cylinder, a piston in said cylinder, a passage of constricted area connecting the ends of said cylinder, substantially as described.

In testimony whereof we have signed our names to this specification in the presence of two subscribing witnesses.

CHARLES ALGERNON PARSONS.
  JOHN TURNBULL.

Witnesses:
 HENRY GRAHAM DAKYNS, Jr.,
 WILLIAM DAGGETT.